United States Patent [19]

Magel

[11] Patent Number: 5,276,748
[45] Date of Patent: Jan. 4, 1994

[54] VERTICALLY-COUPLED ARROW MODULATORS OR SWITCHES ON SILICON

[75] Inventor: Gregory A. Magel, Dallas, Tex.

[73] Assignee: Texas Instruments Incorporated, Dallas, Tex.

[21] Appl. No.: 797,520

[22] Filed: Nov. 22, 1991

[51] Int. Cl.⁵ ............................................. G02B 6/12
[52] U.S. Cl. ...................................... 385/37; 385/8; 65/60.2
[58] Field of Search ............. 385/8, 9, 10, 37, 49; 65/18.1, 18.2, 60.2; 427/248.1, 255, 255.7

[56] References Cited

U.S. PATENT DOCUMENTS

| | | | |
|---|---|---|---|
| 4,869,568 | 9/1989 | Schimpe | 385/37 |
| 4,904,045 | 2/1990 | Alferness et al. | 385/37 |
| 4,971,415 | 11/1990 | Hara et al. | 385/37 |

OTHER PUBLICATIONS

Duguay, M. A., Kokubun, Y., Koch, T. L., Pfeiffer, L., "Antiresonant Reflecting Optical Waveguides in SiO$_2$-Si Multilayer Structures", Applied Physics Letters, vol. 49, pp. 13-15, 1986.

Soref, R. A., Lorenzo, J. P., "All-silicon Active and Passive Guided-wave Components for λ=1.3 and 1.6 μm," IEEE Journal of Quantum Electronics, QE-22, pp. 873-879, 1986.

Koch, T. L., Burkhardt, E. G., Storz, F. G., Bridges, T. J., Sizer, T., II, "Vertically Grating-coupled ARROW Structures for III-V Integrated Optics," IEEE Journal of Quantum Electronics, QE-23, pp. 889-897, 1987.

*Primary Examiner*—Rodney B. Bovernick
*Assistant Examiner*—Stephen W. Barns
*Attorney, Agent, or Firm*—Julie L. Reed; James C. Kesterson; Richard L. Donaldson

[57] ABSTRACT

An optical modulator is disclosed. The modulator is based upon an ARROW waveguide, consisting of a substrate, a lower cladding, an interference layer, and a core layer. An electronic element is formed in the structure to control the free-carrier concentration in the interference layer. The light is coupled by grating into the interference layer, where the free-carrier concentration is controlled by the element, which in turn controls the modulation of the light in the interference layer before it is coupled back to the core layer.

12 Claims, 4 Drawing Sheets

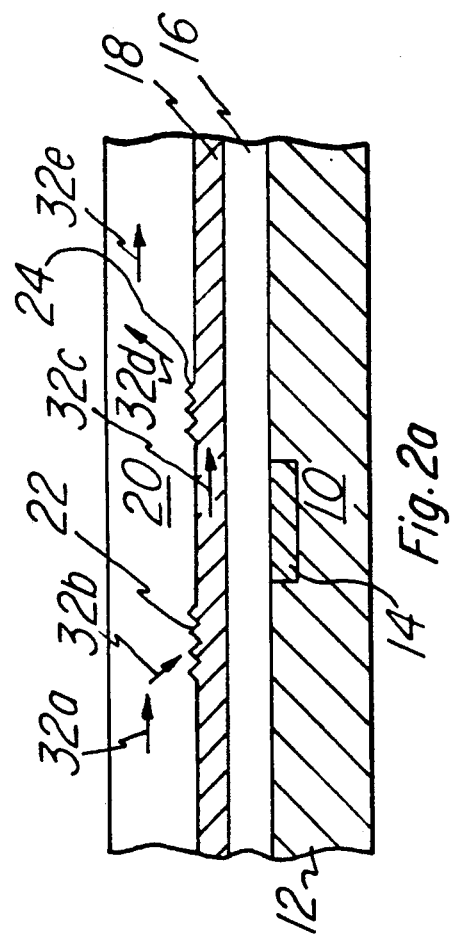
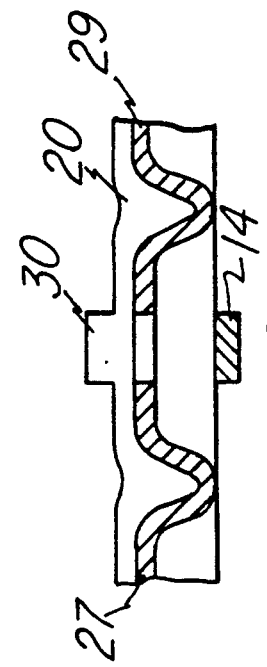
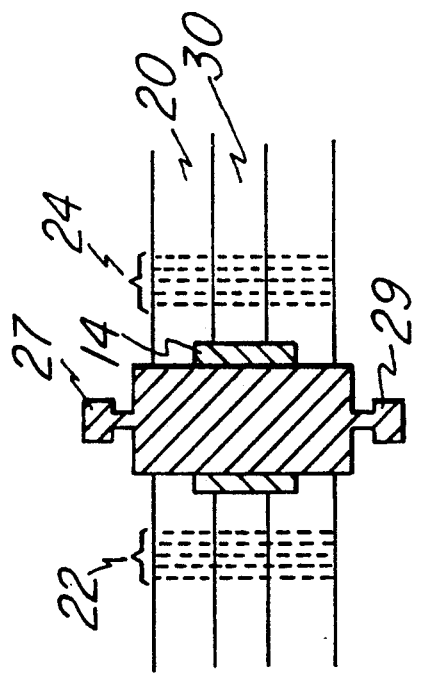

VERTICALLY-COUPLED ARROW MODULATORS OR SWITCHES ON SILICON

BACKGROUND OF THE INVENTION

1. Field of the Invention

This invention relates to optical modulators and switches, more particularly to integrated optic waveguide modulators and switches.

2. Background of the Invention

Anti-resonant Reflecting Optical Waveguides (ARROW) have several advantages over other types of waveguides. They can be formed upon silicon, using relatively thin layers compared to other waveguides, for easier compatibility with other electronic integrated circuits. At the same time, they can have a large mode for coupling to optical fibers. Additionally, they are relatively easy to manufacture, as they require no exotic materials.

These waveguides typically consist of a layer of silicon oxide built upon a silicon substrate. An interference layer of silicon is then placed upon the first layer of silicon oxide, followed by another layer of silicon oxide. All of these materials can be deposited with relative ease. The silicon layer sandwiched between the two silicon oxide layers functions as a passive interference cladding layer. The thickness of the interference layer is not critical.

Vertical coupling has been achieved in such layered structures made of semiconductor materials by the use of periodic gratings in the materials that make up the structure. This technique can be used to couple light between the top core layer and the interference layer.

Active optical modulators are normally difficult to produce in or on silicon. Silicon exhibits no linear electro-optic effect, although changes in absorption or refractive index may be induced by modulating the density of free carriers. All-silicon waveguides tend to have a high propagation loss due to these same free-carrier effects and are difficult to fabricate to have a high modulation efficiency, because of poor modal overlap. All-dielectric waveguides can have low loss, but are typically passive and not useful for modulation. Using an ARROW structure in conjunction with vertical coupling will make it possible to combine the low-loss propagation of dielectric waveguides with the capability of modulating or switching light using free-carrier effects.

SUMMARY OF THE INVENTION

Objects and advantages will be obvious, and will in part appear hereinafter and will be accomplished by the present invention which provides an optical waveguide modulator or switch. The waveguide is an Anti-Resonant Reflecting Optical Waveguide with one interference layer of a semiconductor material between two layers of dielectric material. Free-carrier effects in the interference layer are controlled by application of a current or field to an active electronic element in the layer to modulate light in the layer.

BRIEF DESCRIPTION OF THE DRAWINGS

For a complete understanding of the invention, and the advantages thereof, reference is now made to the following description in conjunction with the accompanying drawings, in which:

FIG. 2A shows a path of light flowing through an ARROW modulator.

FIG. 2B shows a top view of an ARROW modulator with a transistor for controlling free-carrier concentration in a semiconductor interference layer.

FIG. 2C shows an end view of an ARROW modulator with a transistor for controlling free-carrier concentration in a semiconductor interference layer.

DETAILED DESCRIPTION OF THE PREFERRED EMBODIMENTS

Figure 1A:
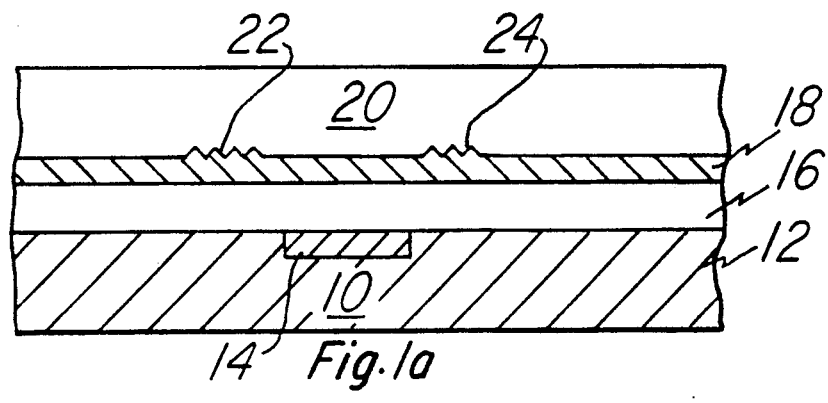
FIG. 1A shows a side view of an ARROW waveguide adapted to modulate light using free-carrier effects.

A side view of an ARROW modulator that uses the free-carrier effect in semiconductors is shown in FIG. 1A. The modulator 10 consists of a substrate 12, which is usually, but not limited to, silicon. Substrate 12 has a doped or deposited area 14, which forms the gate of a transistor. The placement of the source and the drain of the transistor will be covered in further discussion.

Upon the substrate is the lower cladding of the waveguide, 16. This is normally silicon oxide. On top of the lower cladding layer is the interference layer, 18, which, in this example, is silicon. Other semiconductor materials may also be used. The interference layer thickness must be such that constructive interference between the reflections from the top and bottom surfaces of this layer occurs to provide high reflectivity for the mode guided in the core layer.

Periodic gratings 22 and 24 have been formed into the top of the interference layer 18. This can be accomplished by many ways, including etching. Although shown as two separate gratings, they could also be the two ends of a long section of grating. These gratings allow vertical coupling between the core and the interference layer. The core layer, 20, is deposited upon the interference layer, and is typically made out of a dielectric material with high optical transparency, such as silicon oxide, or silicon nitride. The lower cladding layer is chosen to be approximately one-half the thickness of the core, to prevent waveguiding in this layer.

Figure 1B:
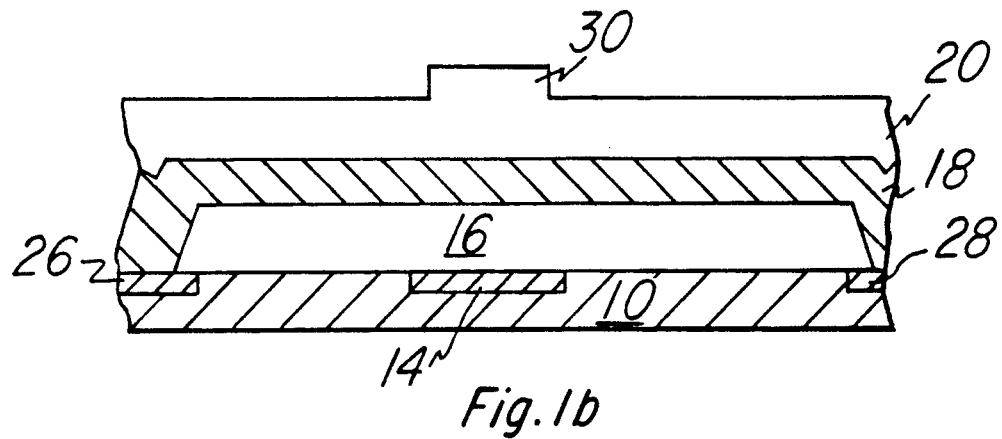
FIG. 1B shows an end view of an ARROW modulator adapted to control free-carrier effects.

FIG. 1B shows an end view of one embodiment of the modulator 10. Substrate 12 has, in addition to gate 14, source contact 26 and drain contact 28. The lower cladding 16 is deposited and etched, or just deposited, in such a manner as to allow the interference layer 18 to "touch down" and come in contact with the substrate 12, and its source and drain contacts. This contact allows the modulator to be controlled, if desired, by circuitry in the substrate. Alternatively, contact may be made from the top through the core layer. As the core layer 20, has a waveguide rib 30, or other structure to transversely confine the light, the cladding underneath the edges of the core is not really necessary anyway. This allows for more freedom in the process design to manufacture the modulator.

FIG. 2A shows the path of light through the modulator. The light enters the core layer 20 from the left of the drawing, shown as arrow 32A. The light travels over the grating 22 and is coupled by and through the grating into the interference layer 18, as shown by arrow 32B. Since the interference layer has a higher refractive index than the surrounding core and cladding layers, it acts as a conventional dielectric waveguide for light traveling within it. While the light is in the interference layer, shown by arrow 32C, control circuitry, or a control element, as will be discussed, can be used to control the free-carrier concentration, and thereby modulate the light. One method for achieving this is to dope the interference layer to form source and drain regions, and to then apply voltage to gate 14. Then, if the resulting transistor is turned off, the free-carrier concentration between the source and drain regions will drop drastically in the silicon. The transistor may conceivably be operated in either the depletion or the enhancement mode. In either case, the changes in free-carrier concentration will result in changes in the refractive index experienced by light guided in the interference layer. For example, an increase in the free-carrier concentration will result in a decrease in the refractive index for light at the 1.3 μm wavelength.

The control of the carrier concentration between the source and drain allows for control of the light that will eventually couple out of the interference layer. The previously passive layer of silicon has been turned into an active element for modulating light.

Lateral confinement for light traveling in this layer is desirable for efficient coupling back into the laterally-confined core layer mode. This may be provided, for example, by doping the interference layer to change its refractive index. For example, germanium could be used for raising the refractive index of a silicon layer. The doping forming the control element may also contribute to lateral confinement.

A possible placement of the source and drain regions is shown in FIG. 2B, a top view of a modulator. The core layer 20 is seen from above, with rib 30 in the middle. Gratings 22 and 24 are shown in dashed lines. These gratings are shown etched onto the interface between the core and interference layers. The preferred placement for the gratings is on the surface of the interference layer, but they may be formed in the material either of the interference layer, or of the core layer. Source 27 and drain 29 are in the interference layer, and are hatched to show the active area in the silicon between them. Gate 14 is under this region, in or on the substrate below the lower cladding layer. It is hatched differently to highlight its location. Light will be modulated or absorbed depending on the state of the transistor, ON or OFF.

FIG. 2C shows an end view of this structure. Source 27 and drain 29 are of the same doping, either n-type or p-type, demonstrated by identical hatching. The gate region 14 is typically in the substrate, as in this case, and under the undoped region between the source and drain regions. The gate must be isolated electrically from the source and drain. As discussed previously, the application of voltage to this control element is used to manage the free-carrier concentration. Additionally, contact regions for the source and drain could be placed in the substrate 12, under regions 27 and 29, where these regions contact the substrate 12.

Figure 3A:
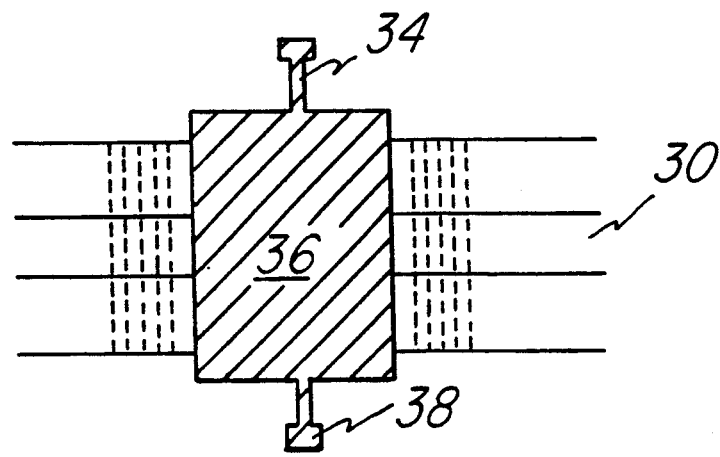
FIG. 3A shows a side view of another ARROW waveguide adapted to modulate light using free-carrier effects.
Figure 3B:
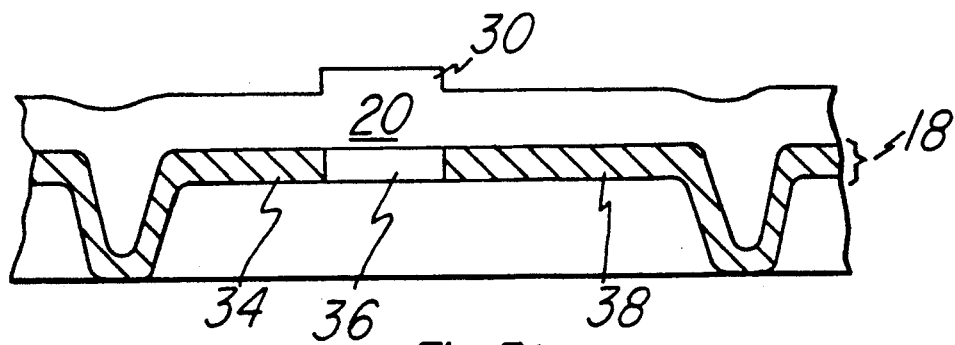
FIG. 3B shows an end view of an alternate embodiment of an ARROW waveguide adapted to modulate light using free-carrier effects.

Another embodiment for control of the free-carrier effects is shown in FIGS. 3A and 3B. A top view of such an embodiment is shown in FIG. 3A. Instead of the transistor in the interference layer as shown previously, a p-i-n diode could be used. The entire region that comprises the p-i-n diode has been shaded for viewing clarity. P-doped region 34 has a lower boundary at the upper edge of the confinement structure 30, as seen on the drawing. The i region 36 is undoped, and lies under the confinement structure 30. The n-doped region 38 has an upper boundary at the lower edge of confinement structure 30, as seen on the drawing. Note that since p-type and n-type doping both reduce the refractive index, this structure also provides for lateral optical confinement in the intrinsic region of the interference layer. The p-i-n diode structure is actually easier to manufacture and allows for better control of the carrier concentration, than the configurations previously discussed.

An end view of this structure is shown in FIG. 3B. Layer 20 is shown with the confinement structure 30. Region 34, the p-doped region, is to the left of the confinement structure, in the interference layer. The interference layer is shown making contact with the semiconductor substrate 12. This is only for electrical connection ease, and better integration of the device. There is no optical reason for this, and this should not be considered as such in the design process.

The p-i-n diode structure controls the free-carrier concentration in the following way. When the structure is reverse biased, the intrinsic region in the interference layer is depleted of carriers. When the structure is forward biased, carriers are injected into this region continuously, where they recombine, allowing current to flow.

Figure 4:
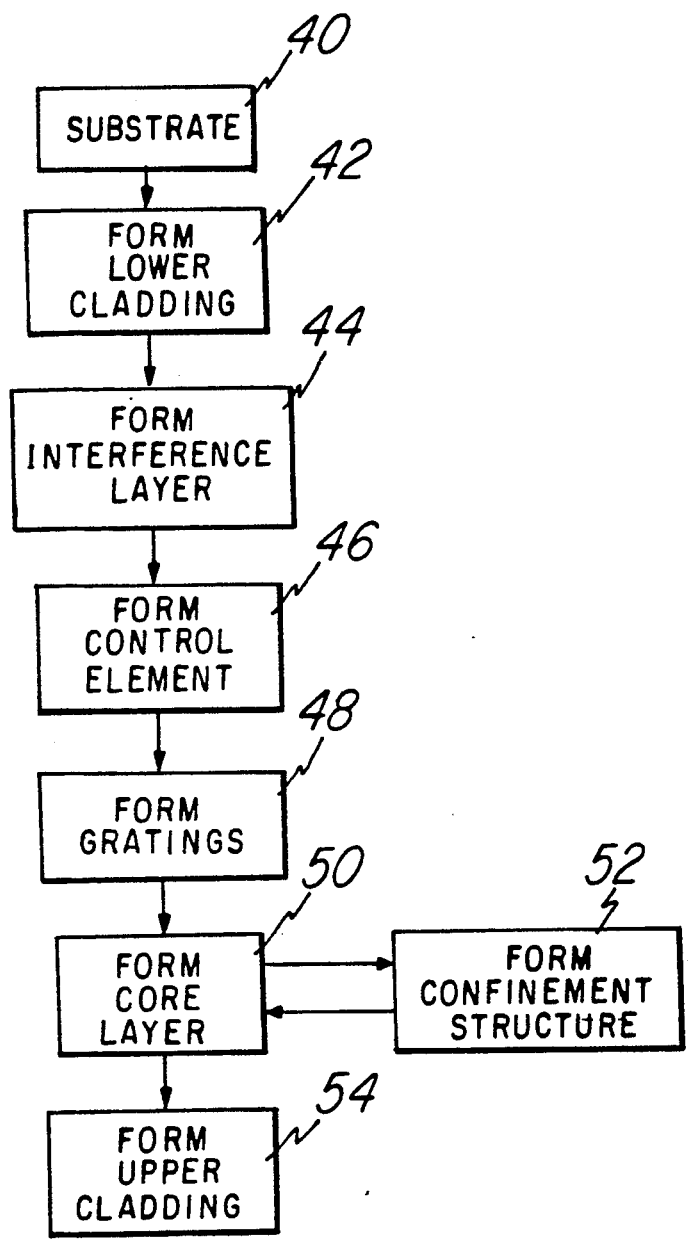
FIG. 4 shows a manufacturing process that could be used to form an ARROW waveguide device adapted to modulate light using free-carrier effects.

FIG. 4 shows a process for manufacture for one embodiment of the invention. The first step, 40, is to prepare a silicon, or other semiconductor material, substrate. The substrate could be silicon, gallium arsenide, or other semiconductor material, and may or may not contain electronic control circuitry. The next step, 42, is to form the lower cladding, usually out of silicon oxide, or silicon nitride. There are many ways in which to form this layer, one of which is to use thermal oxidation, in the case of silicon.

If the substrate is gallium arsenide, the cladding and core layers could be aluminum gallium arsenide ($Al_x Ga_{1-x}As$). The interference layer may be gallium arsenide, or aluminum gallium arsenide with a lower aluminum concentration. This is a choice for the next step 44, in which the interference layer is formed. Again, there are many ways in which to form this layer, including epitaxy, but the preferred embodiment for the Si—SiO₂ system is normally to use chemical vapor deposition. In step 48 the gratings or grating, in the case of using only one long grating, is formed in the interference layer. This can be done many ways, one of which follows. The interference layer is coated with photoresist, and the resist is exposed to make a grating pattern. The interference layer is then etched to form the grating. Another method is to use electron beam patterning.

Step 46 can come at various times in the process, depending on the control element used. In this case, the control element is the lateral p-i-n diode that is formed in the interference layer. The interference layer must be doped to form the p-type and n-type doped regions.

Obviously, if an embodiment where the control element is formed elsewhere in the structure is used, the control element step 46 would occur at a different point of the process. The core layer is best formed using chemical vapor deposition in step 50, selected from many possibilities.

If the use of a confinement structure is determined to be beneficial, this can be formed in step 52. One possible process is as follows. First, the core layer is coated with photoresist. The photoresist is then exposed to form a pattern that defines the confinement structure, and the core layer is etched using either a wet or dry etch. Step 54 is to form the upper cladding. Depending on the environment the device is to operated in, this step may not actually be necessary. In previous discussion, the upper cladding was assumed to be air. But, if a special need arises, the upper cladding would be placed upon the core layer.

The above invention turns a previously passive element of an ARROW waveguide into an active source of modulation. This allows for a device with all of the advantages of an ARROW waveguide discussed previously, plus the addition of modulation. The resultant device has thin cladding layers with a thick core layer for more efficient coupling to optical fibers. The dielectric core has a low loss for propagation over long distances. Additionally, the process for manufacture of such a device is compatible with standard integrated circuit processing, which leads to the additional advantage of being able to be integrated with and controlled by underlying circuitry.

Thus, although there has been described to this point a particular embodiment for an integrated-optic waveguide modulator, it is not intended that such specific references be considered as limitations upon the scope of this invention except in-so-far as set forth in the following claims.

What is claimed is:

1. A method for forming an optical modulator comprising:
   a. preparing a semiconductor substrate;
   b. building a lower cladding layer of a predetermined thickness upon said substrate;
   c. depositing an interference layer upon said lower cladding layer;
   d. depositing a core layer upon said interference layer;
   e. placing gratings in said modulator operable to couple light between said core layer and said interference layer; and
   f. forming an electronic element in said modulator to control free-carrier effects in said interference layer.

2. The method as claimed in claim 1 wherein said building step comprises thermal oxidation.

3. The method as claimed in claim 1 wherein said depositing an interference layer step comprises chemical vapor deposition.

4. The method as claimed in claim 1 wherein said placing step comprises patterning and etching said interference layer.

5. The method as claimed in claim 1 wherein said depositing a core layer step comprises chemical vapor deposition.

6. The method as claimed in claim 1 wherein said forming step comprises doping the interference layer.

7. The method as claimed in claim 6 wherein said forming step further comprises doping the substrate.

8. The method as claimed in claim 6 wherein said forming step further comprises depositing an electrode.

9. The method as claimed in claim 1 wherein said electronic element is a transistor.

10. The method as claimed in claim 1 wherein said electronic element is a diode.

11. The method as claimed in claim 1 wherein said substrate is silicon.

12. The method as claimed in claim 1 wherein said substrate is gallium arsenide.

* * * * *